Figure 1:
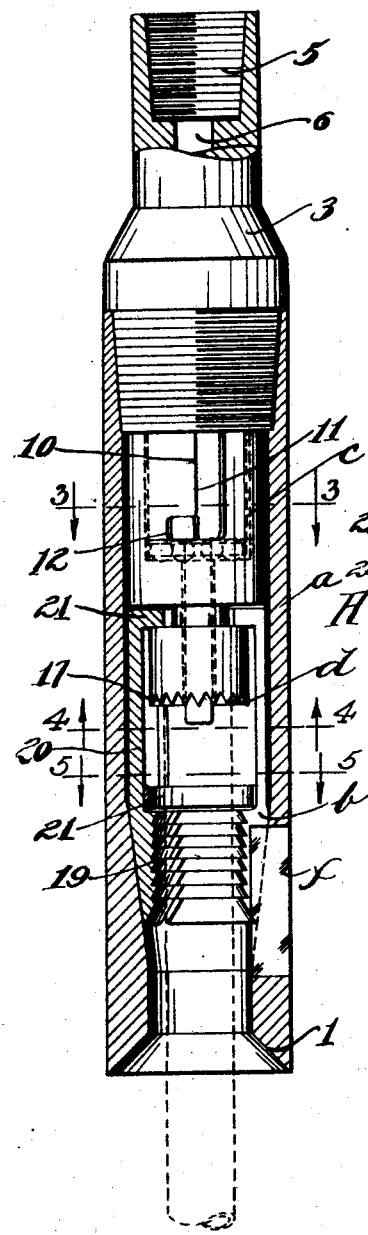

July 28, 1931.  M. P. BORGO ET AL  1,816,207

WELL DEVICE

Filed Oct. 26, 1928

Inventor,
Michael P. Borgo,
Lee S. Sorenson;
By Calvin Brown
Attorney

Patented July 28, 1931

1,816,207

UNITED STATES PATENT OFFICE

MICHAEL P. BORGO, OF LONG BEACH, AND LEE S. SORENSEN, OF LYNWOOD, CALIFORNIA

WELL DEVICE

Application filed October 26, 1928. Serial No. 315,308.

This invention relates to well devices, and particularly to a device adapted for the purpose of recovering lost articles within a well hole. The device contemplates a fishing tool so arranged and constructed as to allow the same to be lowered within a well hole and to grip an article to be secured, and which article may be readily released from the fishing tool if for any reason the article should be frozen within the well hole.

The invention contemplates many novel features of construction which render the device exceedingly strong and durable and not liable to breakage.

In practicing the invention, we have provided a device which includes a substantially annular body or mandrel, a portion adjacent one end of which is provided with an internal tapered wall. Slips are adapted to be moved into gripping engagement with some object by this tapered wall. A slip carrier has a part thereof formed for frictional engagement with the object to be gripped. Thus, when the object to be gripped is received within the body or mandrel, the slip carrier will engage such object and upon a turning of the fishing tool which would turn the body or mandrel, the slip carrier is released, with the result that the slips will engage the object to be secured. The slip carrier may be again secured or locked in position so that the slips are out of engagement or substantially out of engagement with the object to be retrieved.

The invention contemplates certain novel features which are generally superior in use and serviceability for the purpose intended.

With the above mentioned and other objects in view, the invention consists in the novel and useful provision, formation, construction, association and relative arrangement of parts, members and features, all as shown in certain embodiments in the accompanying drawings, described generally and more particularly pointed out in the claim.

Figure 2:
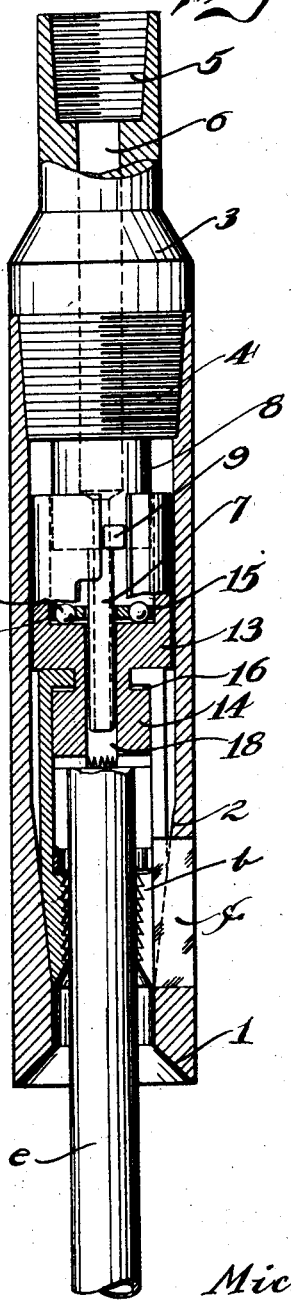
Figure 3:
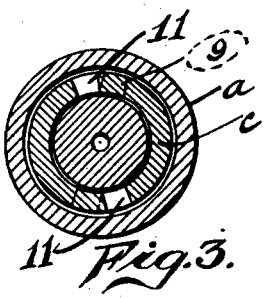
Figure 4:
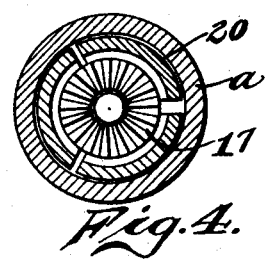
Figure 5:
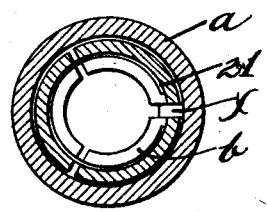

In the drawings:

Figure 1 is a longitudinal sectional view of the improved fishing tool,

Figure 2 is a longitudinal view similar to Figure 1 with the parts in changed relation, Figure 3 is a cross sectional view on the line 3—3 of Figure 1, Figure 4 is a cross sectional view on the line 4—4 of Figure 1, and Figure 5 is a cross sectional view on the line 5—5 of Figure 1.

Referring now with particularity to the drawings, the improved fishing tool as an entirety is designated as A, and the same includes a body, casing $a$, object engaging elements $b$, means $c$ for releasably carrying the means $b$, which means $c$ includes as a part thereof means $d$ for engaging work $e$. The casing $a$ is substantially annular in formation and provided with a bell mouth permitting entrance within said casing and said casing is likewise internally provided with a tapered wall 2. This wall tapers toward the longitudinal axis of said casing adjacent the bell mouth. The upper end of the casing is adapted to receive a coupling member or "sub" 3 constituting a member having a pin portion 4 and a box 5, the pin being secured to the upper end of said casing. This pin and box combination is formed with a central bore 6 and a tube 7 secured to said member 3 is in direct communication with the bore 6. A mandrel or portion of reduced diameter 8 depends from the pin 4, and said portion is provided with one or more outstanding lugs 9. The means $c$ is provided with one or more L-slots 10, which is to say, having an extended longitudinal slot portion and a slot at right angles communicating with such longitudinal portion, all as shown at 11 and 12. The lug 9 is adapted to be received within said slotted portions as will hereinafter appear. To this end, the said means $c$ and $d$ which are inter-connected, comprise two members 13 and 14, the member 13 having a greater external diameter than the member 14, with the member 13 provided with a circular recess 15. Furthermore, the members 13 and 14 are spaced apart, as shown at 16, with the head of said member 14 provided with teeth 17 constituting the object engaging portion of the said means $d$. A central bore 18 is formed in the members 13 and 14, and the tube 7 extends within said central bore. The object engaging elements *b* constitute slips 19, of which there may be more than one, provided with stems 20 having angular ends 21 received in the space 16 included between the members 13 and 14. A circular leaf spring 21 is associated with said slips, if there be more than one, for the purpose of urging said slips outwardly and likewise so that the said slips will always be in engagement with the tapered or inclined wall of the casing *a*. Adapted to be received within the chamber or circular recessed portion of the member 13 is an annular plate 22 fitted with roller bearings 23. Where several slips are used, it is necessary in the invention to prevent rotation as between said slips and the casing *a* and this is done by providing a key *f* fitted within a slot within said body and received between two of such slips.

The operation, uses and advantages of the invention are as follows:

The device A is secured to the usual tubing and the device with the tubing is lowered within the well. The device A will have the parts in the position as shown in Figure 1. Assume that the rod *e* is to be secured. Said rod will enter through the mouth 1 and be received between the slips, with said rod in engagement with the teeth 17 of the means *d*. The tubing is lowered slightly so that weight will be imposed upon said rod *e* whereupon the tubing will be turned counter-clockwise, considering the showing of the figures, so that the lug 9 may move from the slot 12 and into the slot 11. The rod, due to its frictional engagement with said teeth 17, will prevent rotation of the means *c* and *d* when the tubing is slightly rotated in a clockwise direction, which in turn would rotate the casing *a*, with the result that the lug or lugs 9 would be moved from the slot 12 and into the slot 11. The slips would rotate with the casing because of the key *f*. Upon slightly moving the tubing upwardly, which would likewise cause upward movement of the device A, the lug 9 is received within the slot 11 and the casing likewise raised. The slips, however, would move upon the inclined wall of the casing and close upon the work *e* to grip the same. Thus, the work *e* could be raised to the surface of the well hole. If it becomes necessary to release the work *e*, the tubing could be lowered which in turn would allow a lowering of the lug 9 within the slot 11, and upon again turning the tubing slightly, the said lug or lugs could be received within the slot 12 and the parts would again be locked in position so that the device would assume the relationship of the various elements shown in Figure 1.

Thus, with this device, it is possible to secure an object and to release it, if desired. The anti-friction means, which constitutes the plate 22 carrying the rollers 23, permits a ready turning of the casing *a*. If desired, circulation may be maintained through the fishing tool by forcing circulating fluid through the bore 6 of the tube 7 and out through the mouth 1.

It is obvious that various changes and modifications and variations may be made in practicing the invention in departure from the particular showing of the drawings without departing from the true spirit thereof.

We claim:

In a fishing tool, a hollow body, a slip carrier mounted within the body for limited rotational and longitudinal movement relative to the body, said carrier having teeth for engagement with an article to be recovered whereby a turning of the body will allow the carrier to move longitudinally, and slips suspended from the carrier.

In testimony whereof, we have signed our names to this specification at Los Angeles, California, this 17th day of September, 1928.

LEE S. SORENSEN.
MICHAEL P. BORGO.